United States Patent [19]
Edahiro et al.

[11] Patent Number: 4,978,135
[45] Date of Patent: Dec. 18, 1990

[54] VEHICLE SUSPENSION SYSTEM

[75] Inventors: Takeshi Edahiro; Hiroyoshi Kumada; Toshiki Morita; Shin Takehara; Mineharu Shibata, all of Hiroshima, Japan

[73] Assignee: Mazda Motor Corporation, Hiroshima, Japan

[21] Appl. No.: 403,561

[22] Filed: Sep. 6, 1989

[30] Foreign Application Priority Data

Sep. 8, 1988 [JP] Japan .................. 63-225284
Nov. 30, 1988 [JP] Japan .................. 63-300856

[51] Int. Cl.$^5$ ............................................ B60G 11/26
[52] U.S. Cl. .................................. 280/707; 280/714
[58] Field of Search ............... 280/702, 703, 707, 714, 280/611, 689, 693, 698, 804; 267/64, 22

[56] References Cited

U.S. PATENT DOCUMENTS

| | | | |
|---|---|---|---|
| 3,124,368 | 3/1964 | Corley et al. | 280/804 |
| 3,778,081 | 12/1973 | Takahashi et al. | 280/714 |
| 3,836,161 | 9/1974 | Buhl | 280/804 |
| 3,995,883 | 12/1976 | Glaze | 280/707 |
| 4,030,777 | 6/1977 | Rabenseitner | 280/714 |
| 4,295,660 | 10/1981 | Toti et al. | 280/814 |
| 4,371,191 | 2/1983 | Goldberg | 280/707 |
| 4,391,452 | 7/1983 | Ohmori | 280/707 |
| 4,579,366 | 1/1986 | Doi et al. | 280/707 |
| 4,625,993 | 12/1986 | Williams et al. | 280/707 |
| 4,655,440 | 4/1987 | Eckert | 280/707 |
| 4,830,397 | 5/1989 | Watanabe et al. | 280/707 |

FOREIGN PATENT DOCUMENTS

51-18031  2/1976  Japan .

Primary Examiner—Richard A. Bertsch
Attorney, Agent, or Firm—Sixbey, Friedman, Leedom & Ferguson

[57] ABSTRACT

A vehicle suspension system includes a liquid piston-cylinder device connected between the vehicle body and a wheel. A liquid pump is provided in a liquid passage which connects the liquid piston-cylinder device to a reservoir in which hydraulic liquid is reserved, and feeds under pressure the hydraulic liquid in the reservoir through the liquid passage. A control valve controls the flow of the hydraulic liquid through the liquid passage, thereby controlling feed and discharge of the hydraulic liquid to and from the liquid piston-cylinder device in order to control the properties of the suspension. An accumulator is connected to the liquid passage between the liquid pump and the control valve and accumulates the hydraulic liquid under pressure. A return passage connects the reservoir to the liquid passage between the liquid pump and the control valve and is provided with an on-off valve which opens and closes the return passage. The on-off valve closes the return passage when the ignition switch is turned off.

22 Claims, 7 Drawing Sheets

VEHICLE SUSPENSION SYSTEM

BACKGROUND OF THE INVENTION

1. Field of the Invention

This invention relates to a vehicle suspension system which has a piston-cylinder device disposed between the vehicle body and each wheel and in which the suspension properties are changed by control of the hydraulic fluid fed to or discharged from the piston-cylinder device.

2. Description of the Prior Art

There has been known a so-called active suspension system which has a piston-cylinder device disposed between the vehicle body and each wheel and in which the suspension properties such as the vehicle level or hardness of the suspension are changed by control of the hydraulic fluid fed to or discharged from the piston-cylinder device. See U.S. Pat. No. 4,625,993, for instance.

In such an active suspension system, an accummulator is provided in the high pressure passage for feeding the hydraulic fluid to the piston-cylinder device from the hydraulic fluid source, and the hydraulic source normally accumulates hydraulic fluid under a predetermined high pressure in the accummulator so that the hydraulic fluid is basically fed to the piston-cylinder device from the accummulator. With this arrangement, feed of the hydraulic fluid to the piston-cylinder device can be stabilized.

However the arrangement is disadvantageous in that even after the vehicle has been stopped and the engine has been stopped, the high pressure hydraulic fluid is kept accummulated in the accummulator, which is not necessary since the suspension properties need not be controlled any more. This gives rise to the following problem.

That is, when the high pressure hydraulic fluid is kept accummulated in the accummulator even after the engine has been stopped, the accummulator and the pipings, valves and the like connected to the accummulator are kept exposed to the high pressure for a long time, which deteriorates the durability of the accummulator, the pipings, the valves and the like.

Further, when the high pressure hydraulic fluid is kept accummulated in the accummulator, the hydraulic fluid will erupt when a connection of the pipings is loosened for maintenance or the like and disturb the maintenance operation.

SUMMARY OF THE INVENTION

In view of the foregoing observations and description, the primary object of the present invention is to provide a vehicle suspension system in which the durability of the accummulator, the pipings, the valves and the like can be improved and the maintenance operation is facilitated.

In accordance with the present invention, there is provided a vehicle suspension system comprising a liquid piston-cylinder device connected between the vehicle body and a wheel, a liquid passage which connects the liquid piston-cylinder device to a reservoir in which hydraulic liquid is reserved, a liquid pump which is provided in the liquid passage and feeds under pressure the hydraulic liquid in the reservoir through the liquid passage, and a control valve which controls the flow of the hydraulic liquid through the liquid passage, thereby controlling feed and discharge cf the hydraulic liquid to and from the liquid piston-cylinder device in order to control the properties of the suspension, characterized by having an accummulator which is connected to the liquid passage between the liquid pump and the control valve and accummulates the hydraulic liquid under pressure, a return passage which connects the reservoir to the liquid passage between the liquid pump and the control valve, an on-off valve which opens and closes the return passage, and a control signal output means which outputs to the on-off valve a closing signal when a switch means is in an on position where it permits the engine of the vehicle to operate, and outputs to the on-off valve an opening signal when the switch means is in an off position where it stops the engine, the closing signal causing the on-off valve to close the return passage and the opening signal causing the on-off valve to open the return passage.

With this arrangement, the return passage is opened when the switch means, e.g., the ignition switch, is turned off and the engine is stopped, and the high pressure hydraulic liquid accummulated in the accummulator is discharged to the reservoir through the return passage. Accordingly, the accummulator and the parts associated therewith are not exposed to high pressure after the engine is stopped, whereby the durability of the accummulator, the pipings, the valves and the like can be improved and the maintenance operation is facilitated.

DESCRIPTION OF THE PREFERRED EMBODIMENT

In the drawings and the description below, 5 reference numerals accompanied by F denote the parts for the front wheels, those accompanied by R denote the parts for the rear wheels, those accompanied by FR denote the parts for the right front wheel, those accompanied by FL denote the parts for the left front wheel, those accompanied by RR denote the parts for the right rear wheel, and those accompanied by RL denote the parts for the left rear wheel. Further when the parts for the front wheels and the rear wheels, or the parts for the right wheel and the left wheel need not be separated from each other, the parts will be denoted by reference numerals accompanied by no character.

Figure 1:
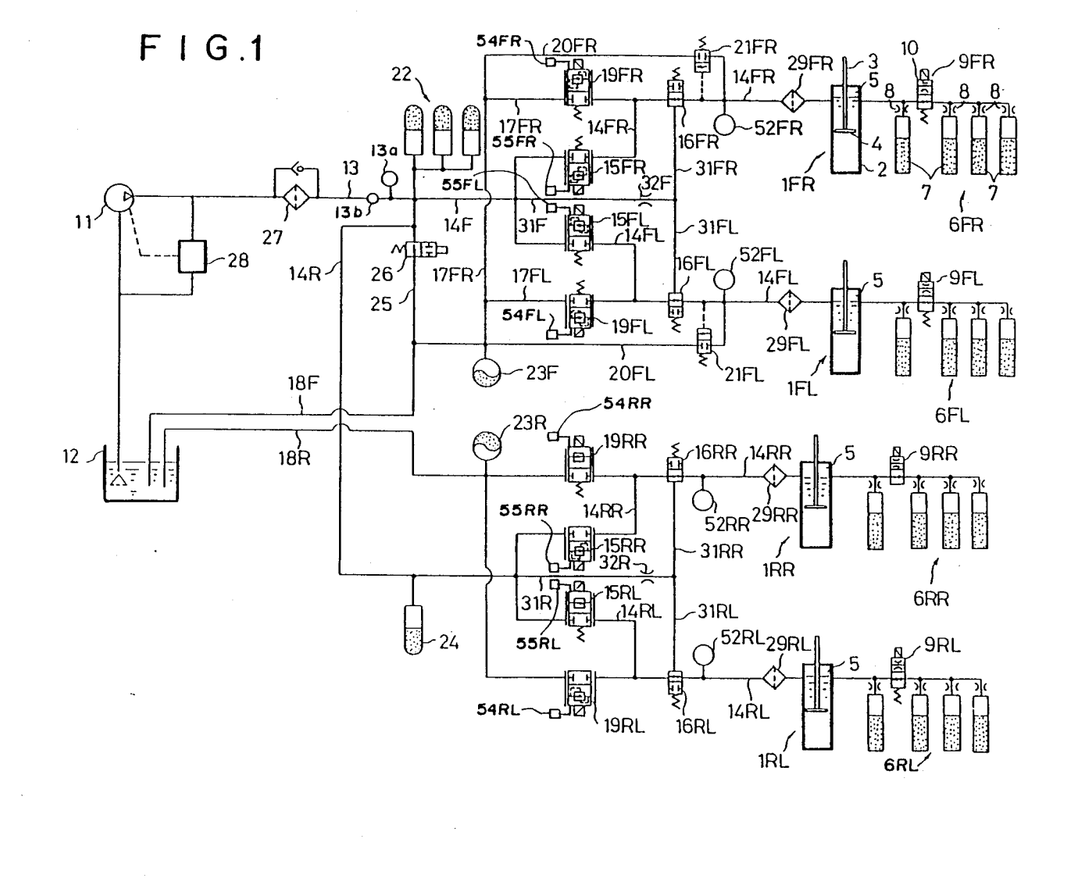
FIG. 1 is a schematic view showing the hydraulic circuit of a suspension system in accordance with an embodiment of the present invention.

In FIG. 1, a piston-cylinder device 1 (1FR, 1FL, 1RR, 1RL) is provided for each wheel. The piston-cylinder device 1 comprises a cylinder 2 connected to the wheel and a piston rod 3 connected to the vehicle body.

The piston rod 3 is provided with a piston 4 which is received in the cylinder 2 and defines a liquid chamber 5 in the upper portion of the cylinder 2. The liquid chamber 5 is communicated with the chamber below the piston 4 and when hydraulic liquid is fed to the liquid chamber 5, the piston rod 3 is extended and the vehicle level is increased. When the hydraulic liquid is discharged from the liquid chamber 5, the vehicle level is lowered.

The liquid chamber 5 is connected to a gas spring (6FR, 6FL, 6RR, 6RL) which comprises four cylinders 7 5 which are smaller than the cylinder 2 in diameter and connected to the liquid chamber 5 in parallel respectively by way of orifices 8. Three of the four cylinders 7 are connected to the liquid chamber 5 by way of a switching valve 9 which moves between a first position (illustrated in FIG. 1) in which it does not substantially limit the flow of the hydraulic liquid and a second position in which an orifice 10 is inserted into the passage which connects the three cylinders 7 to the liquid chamber 5. That is, when the switching valve 9 is in the first position, all the four cylinders 7 are communicated with the liquid chamber 5 by way of the orifices 8 only and accordingly, the gas spring 6 exhibits a relatively small damping force. On the other hand, when the switching valve 9 is in the second position, three of the four cylinders 7 are communicated with the liquid chamber 5 by way of both the orifices 8 and 10, and accordingly, the gas spring 6 exhibits a relatively large damping force. Also the spring properties of the gas spring 6 changes according to the position of the switching valve 9. Further, the properties of the suspension changes with the amount of the hydraulic liquid fed to the liquid chamber 5.

A hydraulic pump 11 sucks the hydraulic liquid in a reservoir 12 and discharges it to a common passage 13 under pressure. The common passage 13 branches into front and rear passages 14F and 14R. The front passage 5 14F further branches into right and left front passages 14FR and 14FL. The right front passage 14FR is connected to the liquid chamber 5 of the right front wheel piston-cylinder device 1FR and left front passage 14FL is connected to the liquid chamber 5 of the left front wheel piston-cylinder device 1FL. A supply side flow control valve 15FR and a delay valve in the form of a pilot valve 16FR are provided in the right front passage 14FR in this order from the upstream side. Similarly, a supply side flow control valve 15FL and a delay valve in the form of a pilot valve 16FL are provided in the left front passage 14FL in this order from the upstream side.

A first relief passage 17FR merges into the right front passage 14FR at a portion between the flow control valve 15FR and the pilot valve 16FR. The first relief passage 17FR is connected to the reservoir 12 by way of a front wheel relief passage 18F. The first relief passage 17FR is provided with a discharge side flow control valve 19FR. A second relief passage 20FR connects a portion of the right front passage 14FR downstream of the pilot valve 16FR to the first relief passage 17F. The second relief passage 20FR is provided with a relief valve 21FR. A filter 29FR is provided in the right front passage 14FR in the vicinity of the piston-cylinder device 1FR. The filter 29FR is disposed between the piston-cylinder device 1FR and the valves 16FR and 21FR nearest to the piston-cylinder device 1FR and prevents the particles abraded from the piston-cylinder device 1FR due to the 5 sliding motion of the piston and the like from entering the valves 16FR and 21FR.

The hydraulic passages for the left front wheel are arranged similarly to the hydraulic passages for the right front wheel and will not be described here.

A main accummulator 22 is connected to the common passage 13, and an accummulator 23F is connected to the front wheel relief passage 18F. The main accummulator 22 together with a sub-accummulator 24 (to be described later) serves as an accummulated hydraulic liquid source and prevents shortage of the hydraulic liquid fed to the piston-cylinder devices 1. The accummulator 23F prevents the high pressure hydraulic liquid in the piston-cylinder devices 1FR and 1FL for the front wheels from being abruptly discharged to the reservoir 12 which is under low pressure (a so-called water hammer).

The hydraulic passages for the piston-cylinder devices 1RR and 1RL for the rear wheels are arranged similarly to the hydraulic passages for the piston-cylinder devices 1FR and 1FL for the front wheels, and will not be described in detail here. However, it should be noted that the valves corresponding to the pilot valves 21FR and 21FL are not provided in the hydraulic passages for the piston-cylinder devices 1RR and 1RL and that the rear passage 14R is provided with the subaccummulator 24 in order to compensate for the increase in the distance from the main accummulator 22.

The common passage 13, or the front and rear 5 passages 14F and 14R, is connected to the front wheel relief passage 18F by way of a relief passage 25, and the relief passage 25 is provided with a control valve 26 which is a solenoid valve in this particular embodiment.

In FIG. 1, reference numerals 27 and 28 respectively denote a filter and a regulator valve. The regulator valve 28 regulates the discharging pressure of the pump 11 within a predetermined range (e.g., 120, to 60 Kg/cm$^2$). In this particular embodiment, the pump 11 is a variable delivery swash plate pump, and the regulator valve 28 is integrally incorporated in the pump. Reference numeral 13a denotes a pressure sensor which detects the pressure in the common passage 13. Further, reference numeral 13b denotes a check valve which prevents the hydraulic liquid from flowing toward the pump 11 from the accummulator 22.

Figure 2:
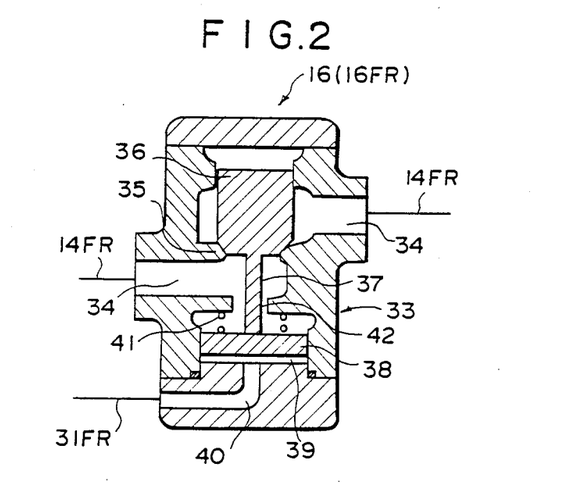
FIG. 2 is a cross-sectional view of a pilot valve.

The pilot valves 16 open or close according to the difference between the pressure in the common passage 3 (i.e., the front and rear passages 14F and 14R) and the pressure in the piston-cylinder device side passage. For this purpose, a front common pilot passage 31F branches off from the front passage 14F. The front common pilot passage 31F is branched into a pair of branch pilot passages 31FR and 31FL which are respectively connected to the pilot valves 16FR and 16FL for the front wheels. The front common pilot passage 31F is provided with an orifice 32F. The pilot passages for the rear wheels are arranged in the similar manner. 5 FIG. 2 shows the pilot valve 16FR for the right front wheel. As shown in FIG. 2, the pilot valve 16FR comprises a casing 33 and a main passage 34 is formed in the casing 33. The right front passage 14FR is connected to the main passage 34. That is, the main passage 34 forms a part of the right front passage 14FR. A valve seat 35 is formed in the main passage 34 and a piston 36 is seated on the valve seat 35 to be movable away therefrom.

The piston 36 is connected to a control piston 38 by a valve stem 37. The control piston 38 is slidably received in a recess formed in the casing 33 and defines a liquid chamber 39. The liquid chamber 39 is communicated with the branch pilot passage 31FR by way of a control passage 40. The control piston 36 is urged by a return spring 41 in the direction in which the piston 36 is brought into contact with the valve seat 35 and closes the pilot valve 16FR. The pressure in the main passage 34 acts on the side of the control piston 38 opposite to the liquid chamber 39 through a communicating port 42. When the pressure in the liquid chamber 39 becomes lower than a quarter of the pressure in the main passage 34 (the pressure in the piston-cylinder device side passage), the piston 36 is brought into contact with the valve seat 35 and the pilot valve 16FR is closed.

When the pressure in the common passage 13 is greatly reduced while the pilot valve 16FR has been opened, the pressure reduction is transmitted to the liquid chamber 39 after a delay by virtue of the orifice 32F, and accordingly, the pilot valve 16FR is closed after a delay from the pressure reduction in the common passage 13. In this particular embodiment, the delay time is about one second.

The operation of the aforesaid valves will be described, hereinbelow.

Said switching valve 9 is actuated so that the damping force of the gas spring 7 is increased when the vehicle makes a cornering.

Said relief valve 21 is normally closed, and is opened when the pressure in the piston-cylinder device side passage exceeds a predetermined value (160 to 200 Kg/cm² in this embodiment). That is, the relief valve 21 functions as a safety valve for preventing the pressure in the piston-cylinder device side passage from abnormally rising. In this embodiment, it is assumed that the weight on the front wheels is much heavier than the weight on the rear wheels and that the pressure in the piston-cylinder device side passages for the rear wheels cannot be higher than that for the front wheels. Accordingly, the piston-cylinder devices 1RR and 1RL are not provided with such a relief valve. Of course, the piston-cylinder devices 1RR and 1RL may also be provided with such a relief valve.

The flow control valves 15 and 19 are solenoid spool valves and are opened and closed. In the open state, each of the control valves 15 and 19 keeps the pressure difference between the upstream side and the downstream thereof approximately constant. (In view of the flow control, the difference should be constant.) More particularly, the displacement of the spool, i.e., the opening of each of the flow control valves 15 and 19 changes in proportion to the current applied thereto. The current applied to each flow control valve is determined on the basis of a flow-current map prepared and stored in advance. That is, the current applied to each flow control valve is determined according to the flow requirement at that time.

That is, the feed to and the discharge from each piston-cylinder device 1 is controlled by control of the flow control valves 15 and 19, and thus the suspension properties are controlled.

When the ignition switch is turned off, only the control for lowering the vehicle level is effected for a predetermined time. This is for preventing the vehicle level from becoming uneven due to change in the vehicle load caused when the passenger gets off the vehicle, for instance.

The control valve 26 is normally energized to open and is closed in the event of a failure, e.g., when the flow control valves 15 and 19 jam, when sensors which will be described later fail, when the pressure of the hydraulic liquid is lost, when the pump 11 fails or the like. 5 Further, the control valve 26 is opened a predetermined time (e.g., two minutes) after the ignition switch is turned off.

When the control valve 26 is opened, the pilot valves 16 are closed after a delay as described above.

The pilot valves 16 are closed after a delay when the pressure in the common passage 13 is lowered by virtue of the orifices 32F and 32R as described above. When one or more of the flow control valves 15 fails and keeps open, the control valve 26 is opened so that the pilot pressure is lowered and the passages 14FR, 14FL, RR and 14RL are closed, thereby maintaining the vehicle level. At this time, the suspension becomes passive.

Figure 3:
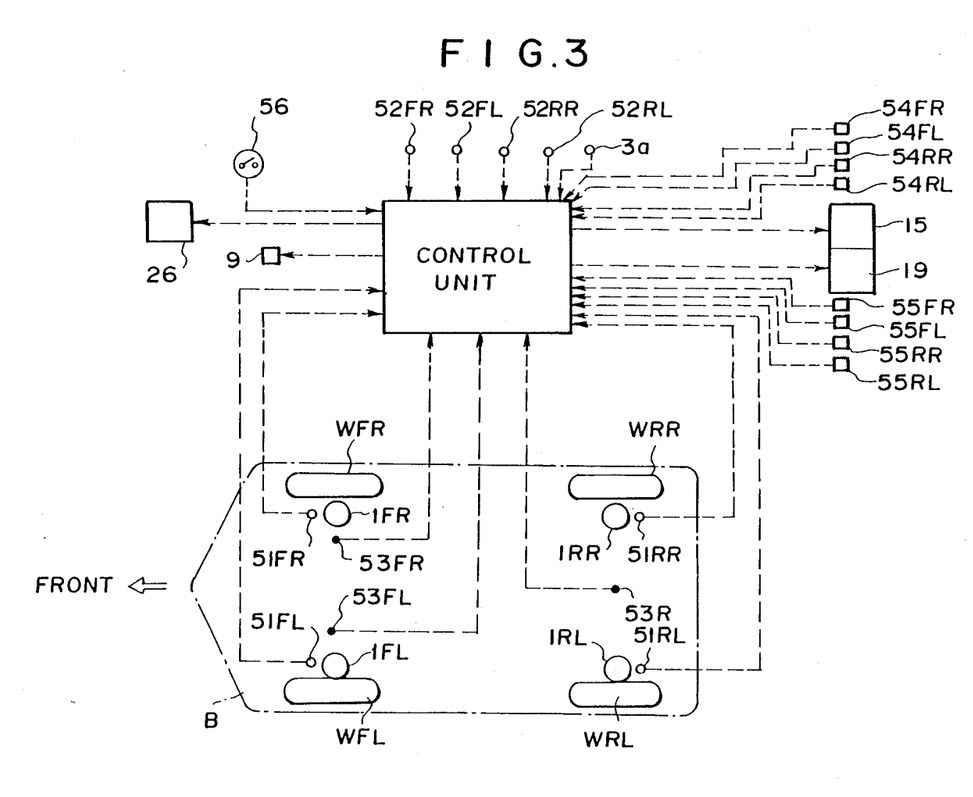
FIG. 3 is a schematic view showing the control system of the hydraulic circuit shown in FIG. 1.
Figure 4:
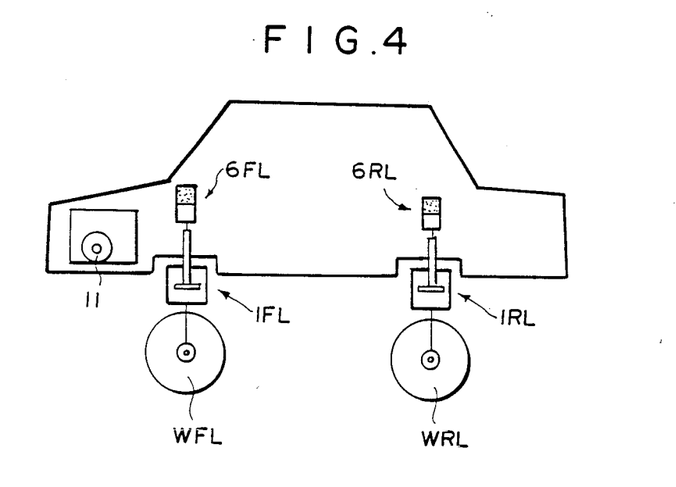
FIG. 4 is a schematic side view of a vehicle provided with the suspension system.

FIG. 3 shows the control system for the hydraulic liquid circuit shown in FIG. 1. In FIG. 3, WFR, WFL, WRR and WRL respectively denote the right and left front wheels and the right and left rear wheels, and U denotes the control unit comprising a micro computer. To the control unit U are input signals from sensors FR, 51FL, 51RR, 51RL, 52FR, 52FL, 52RR, 52RL, 53FR, FL, 53R, 54FR, 54FL, 54RR, 54RL, 55FR, 55FL, 55RR, and RL. Further, an on-off signal is input into the control unit U from an ignition switch position sensor 56. The control unit U outputs control signals to the flow control valves 15 (15FR to 15RL) and 19 (19FR to 9RL) and to the control valve 26. The sensors 51FR to 1RL are piston position sensors which are respectively provided for the piston-cylinder device 1FR to 1RL and 5 detect the positions of the corresponding pistons, i.e., the vehicle levels at the respective wheels. The sensors 52FR to 52RL are pressure sensors which detect the pressure in the liquid chambers 5 of the piston-cylinder devices 1FR to 1RL. The sensors 53FR, 53FL and 53R are G sensors which detects the vertical acceleration. The G sensors 53FR and the 53FL are disposed on the front axle of the vehicle body symmetrically with the longitudinal axis of the vehicle body, and the other G sensor 53R is disposed on the rear axle on the longitudinal axis of the vehicle body. The G sensors 53FR, 53FL and 53R define a imaginary plane which which has been set to be horizontal.

Figure 5:
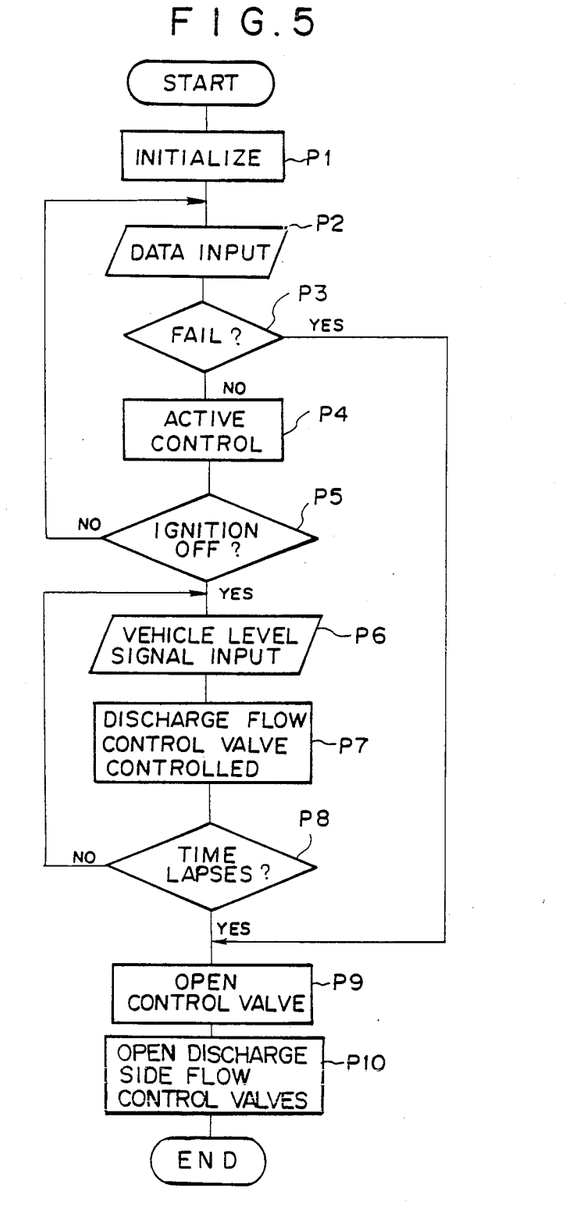
FIG. 5 is a flow chart for illustrating the operation of the control unit.

The operation of the control unit U will be described with reference to the flow chart shown in FIG. 5. In the flow chart shown in FIG. 5, the control the switching valve 9 is omitted.

This flow chart starts then the ignition switch is turned on. In step Pl, the system is initialized and the control valve 26 is closed. Then, the signals from the sensors are input into the control unit U in step P2. In step P3, whether any failure has occurred is determined in the manner which will be described later. When it is determined in the step P3 that no failure has occurred, the control unit U performs the active control in step P4. In the active control, the control unit U controls the flow control valves 15 and 19 so that the bounce, the pitching, the roll, and the warp of the vehicle body become desired values (t be described in more detail later).

In the next step P5, it is determined whether the ignition switch has been turned off. When it is determined that the ignition switch has not been turned off, the control unit U returns to the step P2.

When it is determined in the step P5 that the ignition switch has been turned off, the vehicle level signals are read in step P6, and only the discharge side flow control valve 19 is controlled in step P7 so that the level of a part of the vehicle body cannot be higher than the other part. Thereafter, the control valve 26 is opened after a delay of two minutes from the time the ignition switch is turned off. (steps P8 and P9) Since the pilot valves 16 are closed after a delay from the opening of the control valve 26, the change in the vehicle level due to leak of the hydraulic liquid through the flow control valves 15 and 19 or the like can be surely prevented.

When it is determined in the step P3 that a failure has occurred, the control unit U immediately proceeds to the step P9 and opens the control valve 26. Further, in step P10, the control unit U fully opens the discharge side flow control valves 19 (19FR to 19RL) during the time after the control valve 26 is closed and before the pilot valves 16 are closed. When the discharge side flow control valves 19 are fully opened in this manner, the vehicle level is minimized and then fixed there in the case of a failure.

Figure 8:
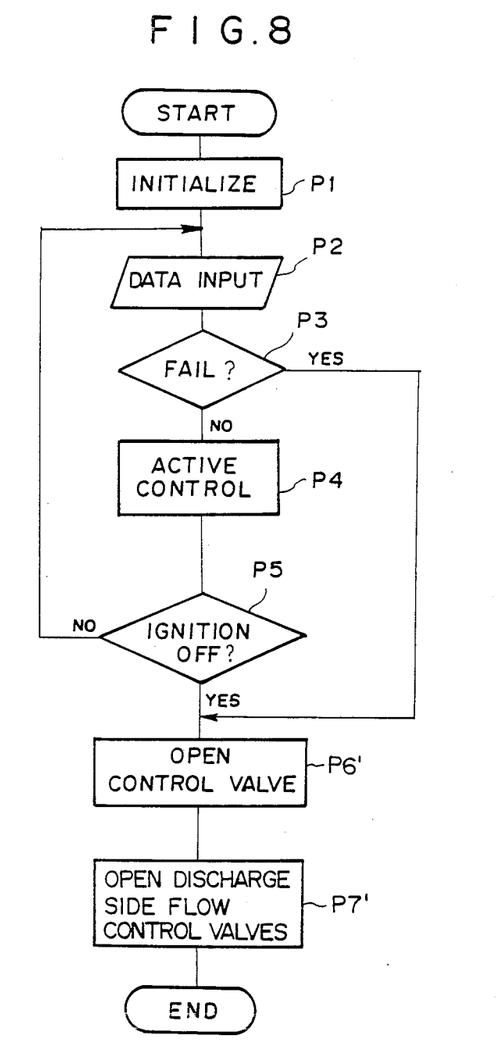
FIG. 8 is a flow chart for illustrating a modification of the operation shown in FIG. 6.

The steps P6 to P8 may be omitted as shown in FIG. 8.

Figure 6:
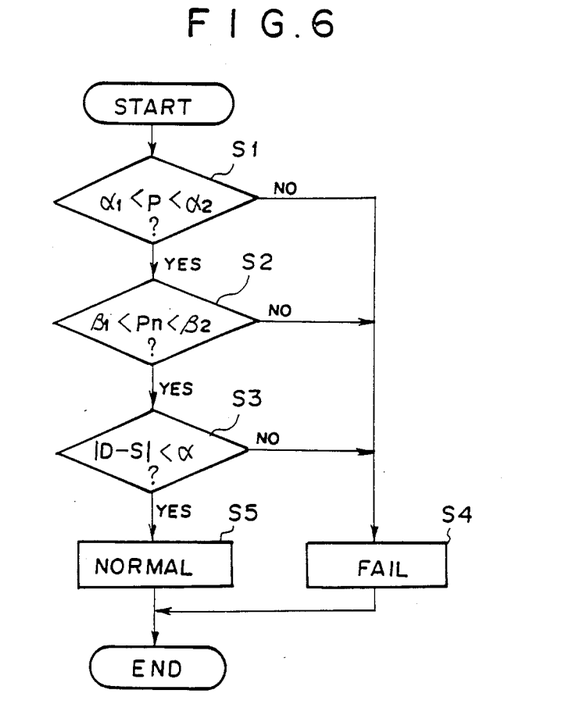
FIG. 6 is a flow chart for illustrating the operation of the control unit for determining whether the system fails.

FIG. 6 shows the flow chart for illustrating the operation to be done by the control unit U in order to determine whether the system fails. In FIG. 6, the control unit U determines in step S1 whether the pressure P in the common passage 13 detected by the pressure sensor 13a is between lower and upper limits of the normal value $\alpha_1$ and $\alpha_2$. The range of the normal value has been set so that the pressure P in the common passage 13 is within the range so long as the pump 11, the pressure regulator valve 28 and the common passage 13 are normal. In step S2, the control unit U determines whether the pressures Pn in the passages 14FR to 14RL detected by the pressure sensors 52FR to 52RL are between lower and upper limits of the normal value $\beta_1$ and $\beta_2$. The range of the normal value has been set so that the pressures Pn in the passages 14FR to 14RL are within the range so long as the passages 14FR to 14RL, the relief valves 21FR and 21FL and the like are normal. Further, the control unit U determines in step S3 whether the deviations of the actual positions S of the flow control valves 15FR to 15RL from the target positions D designated by the control signals input into the respective valves are within the allowable range $\gamma$, thereby determining whether the valves are functioning correctly.

When at least one of the answers to the questions 5 in the steps S1 to S3 is NO, the control unit U determines that some failure has occurred in the system. (step S4) Otherwise, the control unit U determines that the system is normal. (step S5)

The operation shown in FIG. 6 is repeated at predetermined intervals, e.g., every several msec.

The suspension property control done by the control unit U in the step P4 in FIG. 5 will be described with reference to FIG. 7, hereinbelow.

The suspension property control includes a vehicle attitude control based on the outputs of the vehicle level sensors 51FR to 51RL, a driving comfort control based on the G sensors 53FR, 53FL and 53R, and a vehicle body warp control based on the pressure sensors 52FR to 52RL.

The vehicle attitude control comprises a bounce control, a pitch control and a roll control, and each control is a feedback control on the basis of an IPD control.

Figure 7:
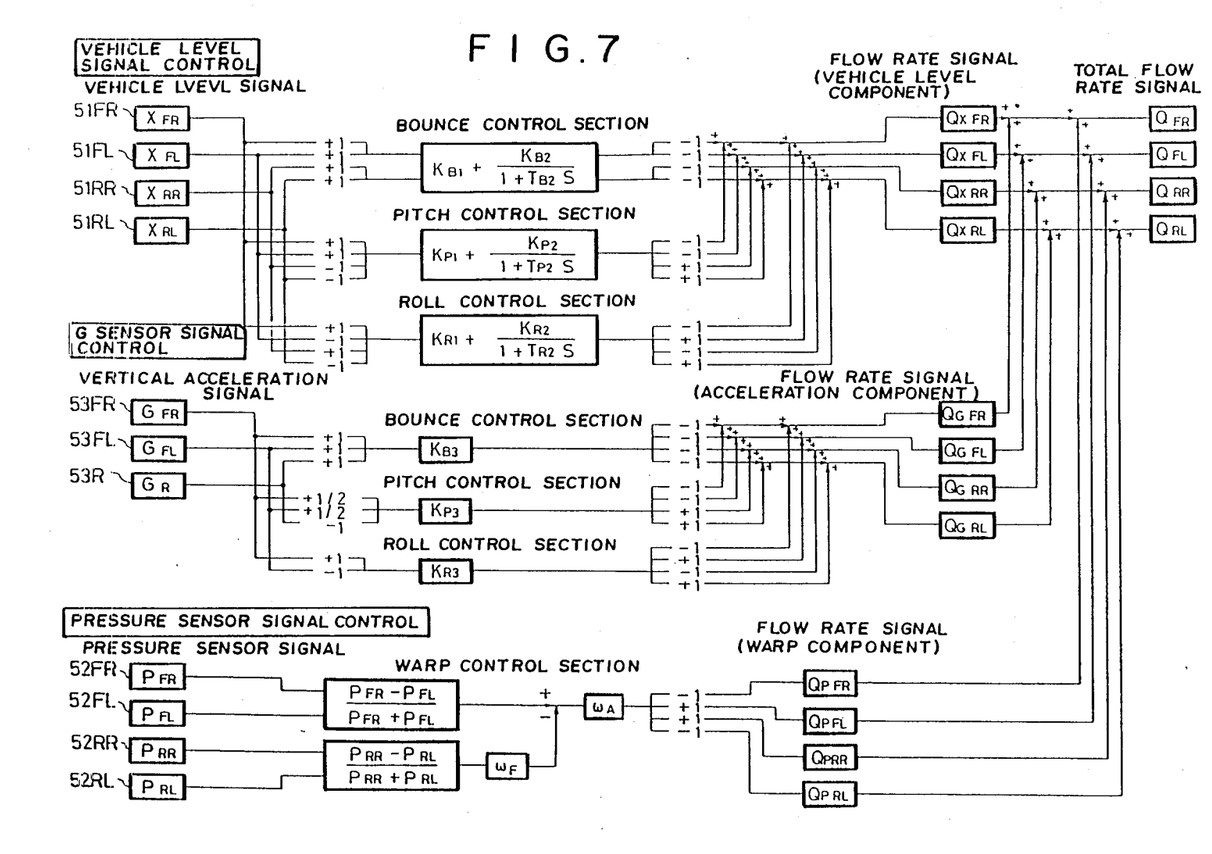
FIG. 7 is the system diagram for effecting the active control of the suspension system shown in FIG. 1.

How to handle the outputs of the pressure sensors in the three attitude controls is denoted by "+" or "−" provided on the left side of each control section shown in FIG. 7. The "+" or "−" provided on the right side of each control section indicates that the control section restrains change in the attitude of the vehicle body, and is opposite to the symbol provided on the left side of the control section.

That is, in the bounce control, the IPD control is effected so that the sum of the left front level and the right front level and the sum of the left rear level and the right rear level are conformed to a reference vehicle level. In the pitch control, the IPD control is effected so that the difference between the sum of the left front level and the right front level and the sum of the left rear level and the right rear level approximates zero. In the roll control, the IPD control is effected so that the sum of the left front level and the left rear level approximates the sum of the right front level and the right rear level.

The control values obtained in the three IPD controls are added up for the respective four piston-cylinder devices 1 and are finally converted into four flow rate signals QXFR to QXRL for the attitude control.

The driving comfort control is for preventing deterioration of the driving comfort due to the attitude control described above. Accordingly, feedback controls (proportional in this embodiment) are effected on the bounce, the pitch and the roll corresponding to the three attitude controls so as to restrain the vertical acceleration.

Since the G sensors are only three in number, the arithmetic mean of the left front vertical acceleration and the right front vertical acceleration is used as the front vertical acceleration for the pitch control. For the roll control, only the left front vertical acceleration and the right front vertical acceleration are used. Also in the driving comfort control, the control values obtained in the three proportional controls are added up for the respective four piston-cylinder devices 1 and are finally converted into four flow rate signals QGFR to QGRL for the driving comfort control.

The warp control is for restraining the worp of the vehicle body B. That is, since the pressures acting on the respective piston-cylinder devices 1 correspond to the loads on the corresponding wheels, the warp of the vehicle body B due to the loads is restrained.

More particularly, feedback control is effected so that the ratio of the difference between the pressure on the right front piston-cylinder device 1FR and that on the left front piston-cylinder device 1FL to the sum of the same conforms to the ratio of the difference between the pressure on the right rear piston-cylinder device 1RR and that on the left rear piston-cylinder device 1RL to the sum of the same. Then the amount of warp of the front side and the amount of warp of the rear side are weighted by a weighting coefficient $\omega F$. Further, the amounts of warp are weighted by a weighting coefficient $\omega A$ against the aforesaid two controls. Also in the warp control the control values are finally converted into four flow rate signals QPFR to QPRL for the driving comfort control.

The flow rate signals for the attitude control, the driving comfort control and the warp control for each piston-cylinder device are added up and final flow rate signals QFR and QRL are obtained. The flow control valves are controlled on the basis of the final flow rate signals QFR and QRL.

We claim:

1. A vehicle suspension system comprising a liquid piston-cylinder device connected between the vehicle body and a wheel, a liquid passage which connects the liquid piston-cylinder device to a reservoir in which hydraulic liquid is reserved, a liquid pump which is provided in the liquid passage and feeds under pressure the hydraulic liquid in the reservoir through the liquid passage, and a control valve which controls the flow of the hydraulic liquid through the liquid passage, thereby controlling feed and discharge cf the hydraulic liquid to and from the liquid piston-cylinder device in order to control the properties of the suspension, characterized by having an accummulator which is connected to the high-pressure liquid passage between the liquid pump and the control valve and accummulates the hydraulic liquid under pressure, a return passage which connects the reservoir to the high-pressure liquid passage between the liquid pump and the control valve, an on-off valve which opens and closes the return passage, and a control signal output means which outputs to the on-off valve a closing signal when a switch means is in an on position where it permits the engine of the vehicle to operate, and outputs to the on-off valve an opening signal when the switch means is in an off position where it stops the engine, the closing signal causing the on-off valve to close the return passage and the opening signal causing the on-off valve to open the return passage.

2. A vehicle suspension system as defined in claim 1 in which said on-off valve ia solenoid valve.

3. A vehicle suspension system as defined in claim 2 in which said solenoid valve is a normal open type which closes the return passage while it is energized and opens the return passage while it is not energized.

4. A vehicle suspension system as defined in claim 2 in which when said switch means is turned off, said control signal output means outputs the opening signal to the solenoid valve a predetermined time after the turning off of the switch means.

5. A vehicle suspension system as defined in claim 1 further comprising a failure detecting means which detects a failure of the suspension system and a means for outputting a signal which positively opens said on-off valve when the system fails.

6. A vehicle suspension system as defined in claim 1 in which a second on-off valve is provided in the liquid passage communicating the liquid piston-cylinder device and the control valve and opens and closes the liquid passage.

7. A vehicle suspension system as defined in claim 6 in which said second on-off valve is normally opened and closes when the pressure in said high-pressure liquid passage is reduced by a predetermined value.

8. A vehicle suspension system as defined in claim 7 in which said second on-off valve is opened and closed according to the difference between the pressure in the high-pressure liquid passage and the pressure in the liquid passage which communicates the liquid piston-cylinder device and the control valve.

9. A vehicle suspension system as defined in claim 7 in which a pilot passage is connected to said high-pressure liquid passage and introduces the pressure in the high-pressure liquid passage into the second on-off valve.

10. A vehicle suspension system as defined in claim 9 in which said second on-off valve comprises a valve body portion which is movable toward and away from a valve seat formed in the liquid passage communicating the liquid piston-cylinder device and the control valve, and a pressure receiving portion which is formed integrally with the valve body portion and on which the pressure in the liquid passage communicating the liquid piston-cylinder device and the control valve and the pressure in said pilot passage act in opposite directions.

11. A vehicle suspension system as defined in claim 9 in which a delay means which delays propagation of the pressure is provided in the pilot passage so that change in the pressure in the high-pressure liquid passage is transmitted to the second on-off valve after a delay.

12. A vehicle suspension system as defined in claim 11 in which said delay means comprises an orifice.

13. A vehicle suspension system as defined in claim 1 in which said control valve is a flow control valve.

14. A vehicle suspension system as defined in claim 1 in which the liquid chamber of said liquid piston-cylinder device is connected to a gas spring means.

15. A vehicle suspension system as defined in claim 14 in which said gas spring means comprises a plurality of gas springs and a switching means which changes the connection of the gas springs to the piston-cylinder device.

16. A vehicle suspension system as defined in claim 1 in which said control valve comprises a feed valve which feeds the hydraulic liquid to the piston-cylinder device and a discharge valve which discharges the hydraulic liquid from the piston-cylinder device, and a damping means which damps the pressure fluctuation in the passage connecting the discharge valve to the reservoir is provided in the passage connecting the discharge valve to the reservoir.

17. A vehicle suspension system as defined in claim 1 further comprising a pressure regulator valve which regulates the pressure of the hydraulic liquid discharged from the pump within a predetermined range.

18. A vehicle suspension system as defined in claim 1 in which a check valve is provided in the highpressure liquid passage between the pump and the accummulator, and prevents the hydraulic liquid from flowing toward the pump from the accummulator.

19. A vehicle suspension system comprising a liquid piston-cylinder device connected between the vehicle body and a wheel, a liquid passage which connects the liquid piston-cylinder device to a reservoir in which hydraulic liquid is reserved, a liquid pump which is provided in the liquid passage and feeds under pressure the hydraulic liquid in the reservoir through the liquid passage, and a control valve which controls the flow of the hydraulic liquid through the liquid passage, thereby controlling feed and discharge of the hydraulic liquid to and from the liquid piston-cylinder device in order to control the properties of the suspension, characterized by having an accummulator which is connected to the high-pressure liquid passage between the liquid pump and the control valve and accummulates the hydraulic liquid under pressure, a return passage which connects the reservoir to the high-pressure liquid passage between the liquid pump and the control valve, an on-off valve which opens and closes the return passage, a control signal output means which outputs to the on-off valve a closing signal when a switch means is in an on position where it permits the engine of the vehicle to operate, and outputs to the on-off valve an opening signal when the switch means is in an off position where it stops the engine, the closing signal causing the on-off valve to close the return passage and the opening signal causing the on-off valve to open the return passage, a failure detecting means which detects a failure of the suspension system and a means for outputting a signal which positively opens said on-off valve when the system fails, a second on-off valve which is provided in the liquid passage communicating the liquid piston-cylinder device and the control valve, and normally opens the liquid passage and closes when the pressure in said high-pressure liquid passage is reduced by a predetermined value, a pilot passage which is connected to said high-pressure liquid passage and introduces the pressure in the high-pressure liquid passage into the second on-off valve, and a delay means which delays propagation of the pressure is provided in the pilot passage so that change in the pressure in the high-pressure liquid passage is transmitted to the second on-off valve after a delay.

20. A vehicle suspension system as defined in claim 19 further comprising a signal outputting means which outputs a control signal which causes the control valve to discharge the hydraulic liquid in the piston-cylinder device when said failure detecting means detects a failure of the suspension system.

21. A vehicle suspension system as defined in claim 20 in which said delay means comprises an orifice.

22. A vehicle suspension system comprising a liquid piston-cylinder device connected between the vehicle body and a wheel, a liquid passage which connects the liquid piston-cylinder device to a reservoir in which hydraulic liquid is reserved, a liquid pump which is provided in the liquid passage and feeds under pressure the hydraulic liquid in the reservoir through the liquid passage, and a control valve which controls the flow of the hydraulic liquid through the liquid passage, thereby controlling feed and discharge of the hydraulic liquid to and from the liquid piston-cylinder device in order to control the properties of the suspension, characterized by having or which is connected to the high-pressure liquid passage between the liquid pump and the control valve and accummulates the hydraulic liquid under pressure, a return passage which connects the reservoir to the high-pressure liquid passage between the liquid pump and the control valve, an on-off valve which opens and closes the return passage, a control signal output means which outputs to the on-off valve a closing signal when a switch means is in an on position where it permits the engine of the vehicle to operate, and outputs to the on-off valve an opening signal when the switch means is in an off position where it stops the engine, the closing signal causing the on-off valve to close the return passage and the opening signal causing the on-off valve to open the return passage, a failure detecting means which detects a failure of the suspension system and a means for outputting a signal which positively opens said on-off valve when the system fails, and a signal outputting means which outputs a control signal which causes the control valve to discharge the hydraulic liquid in the piston-cylinder device when said failure detecting means detects a failure of the suspension system.

* * * * *